June 26, 1962 T. E. McDOWELL 3,041,027
VEHICLE TIE-DOWN
Filed Feb. 23, 1960 4 Sheets-Sheet 1
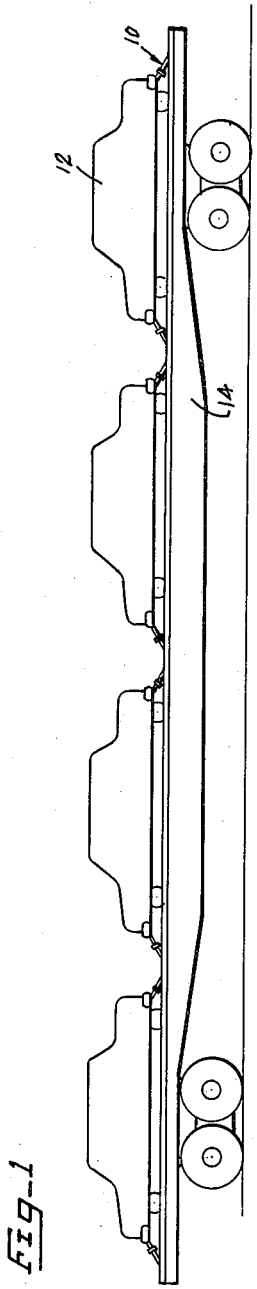
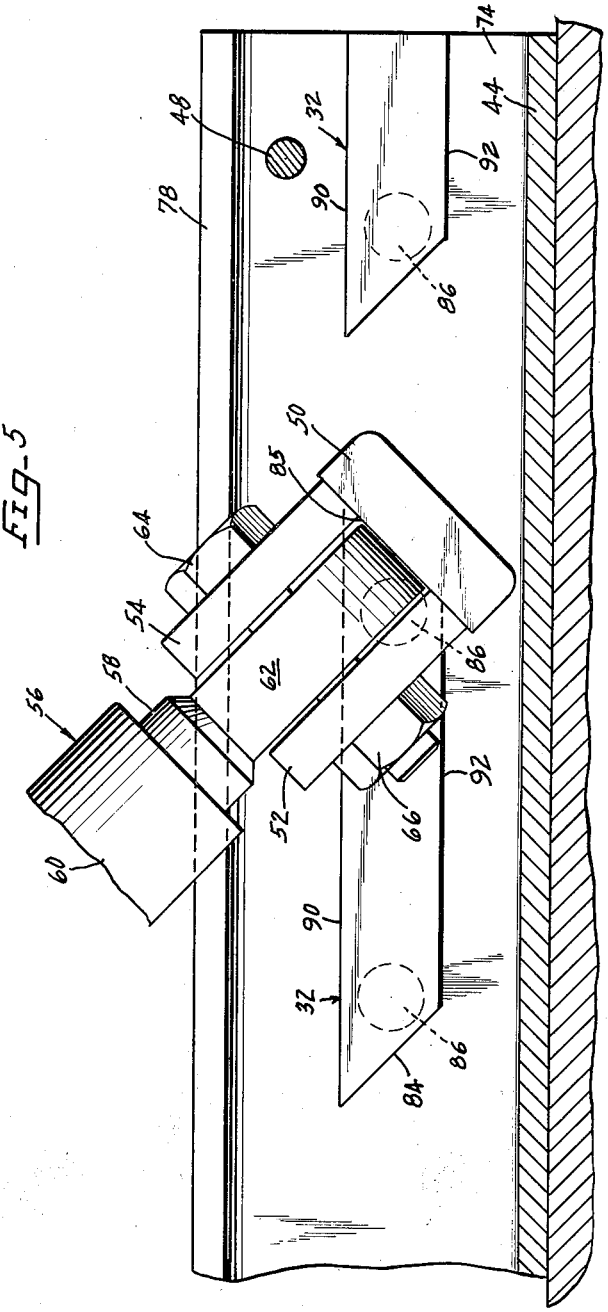
Inventor
Thomas E. McDowell June 26, 1962 T. E. McDOWELL 3,041,027
VEHICLE TIE-DOWN
Filed Feb. 23, 1960 4 Sheets-Sheet 2
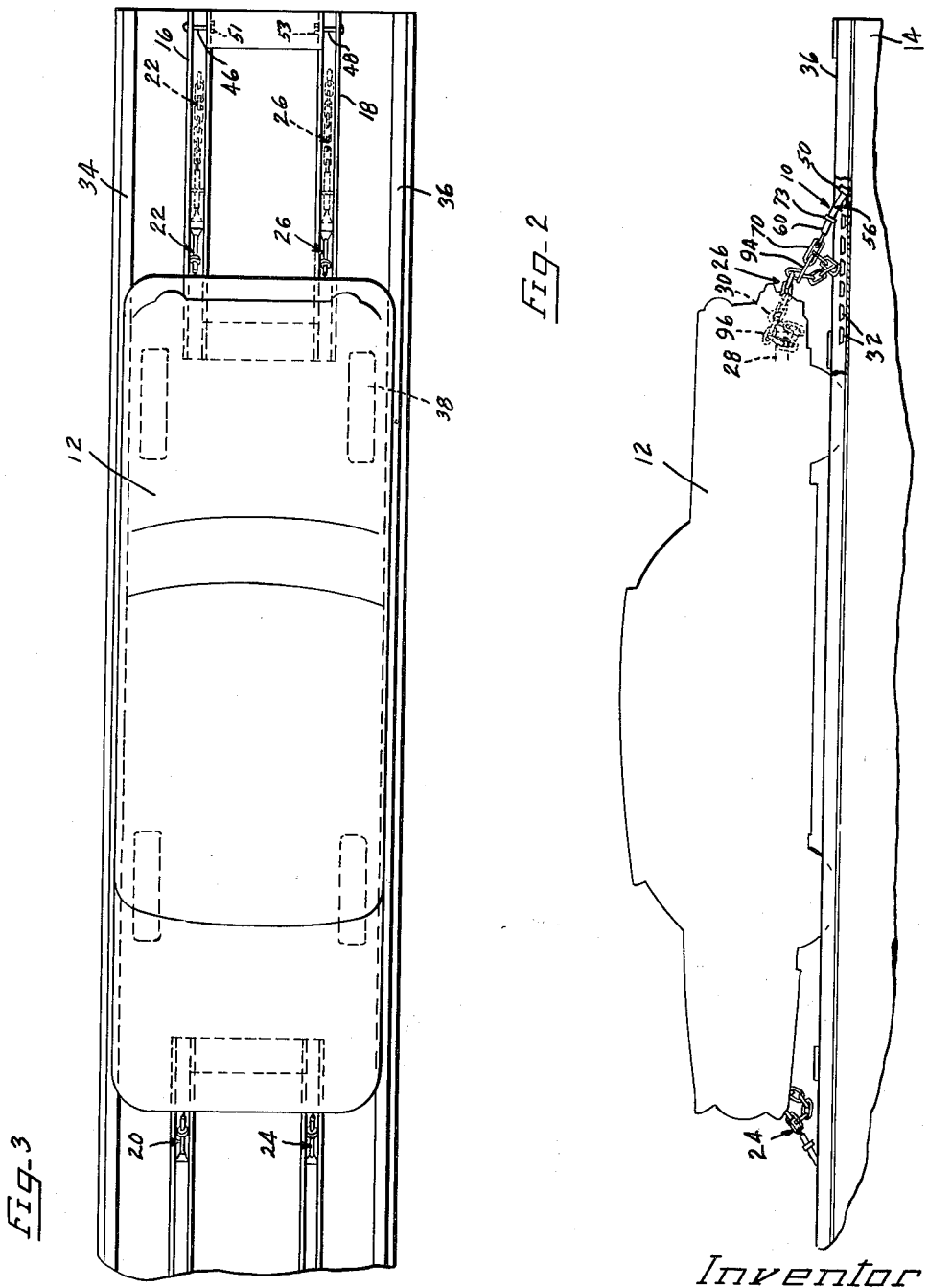
Inventor
Thomas E. McDowell

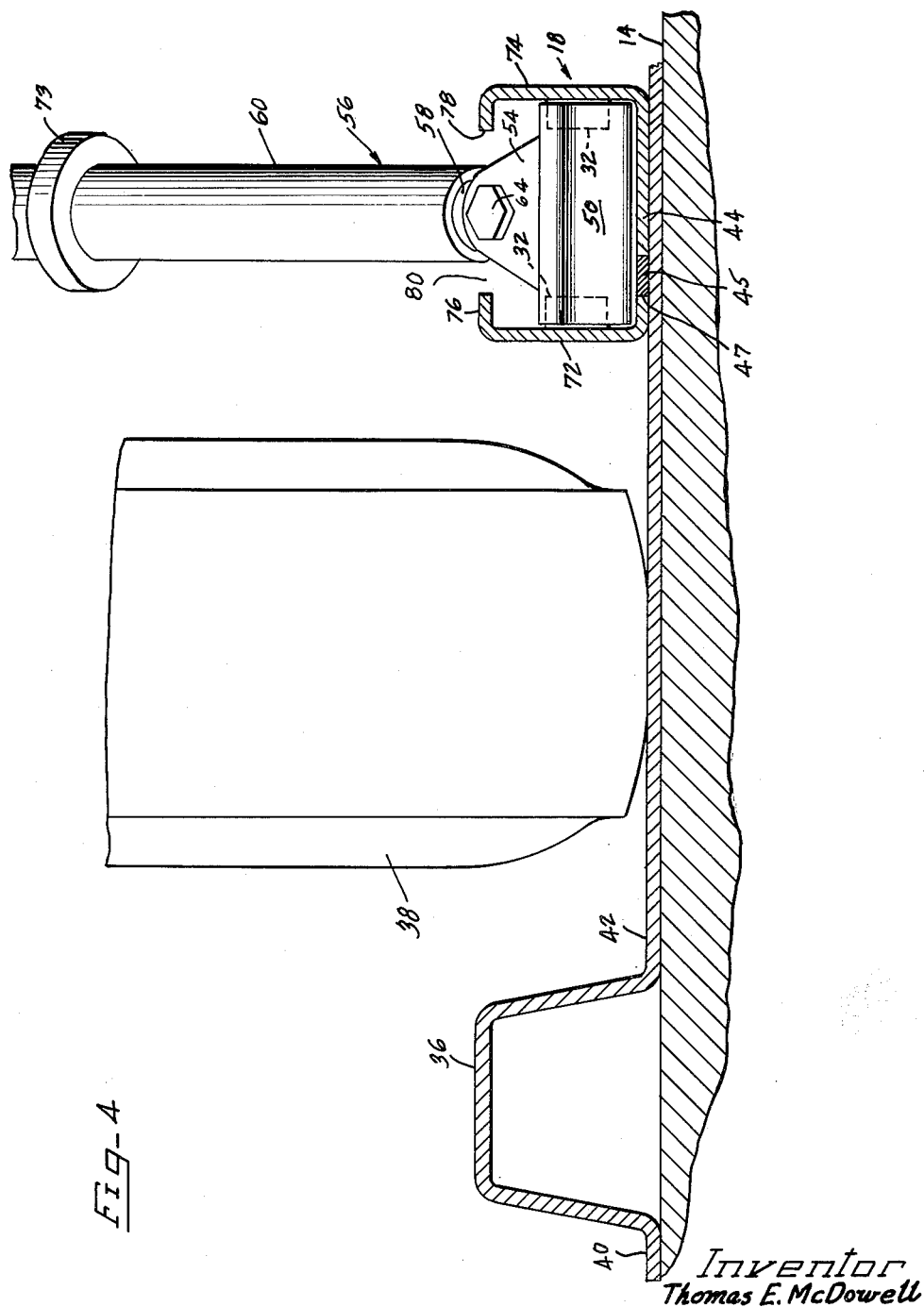

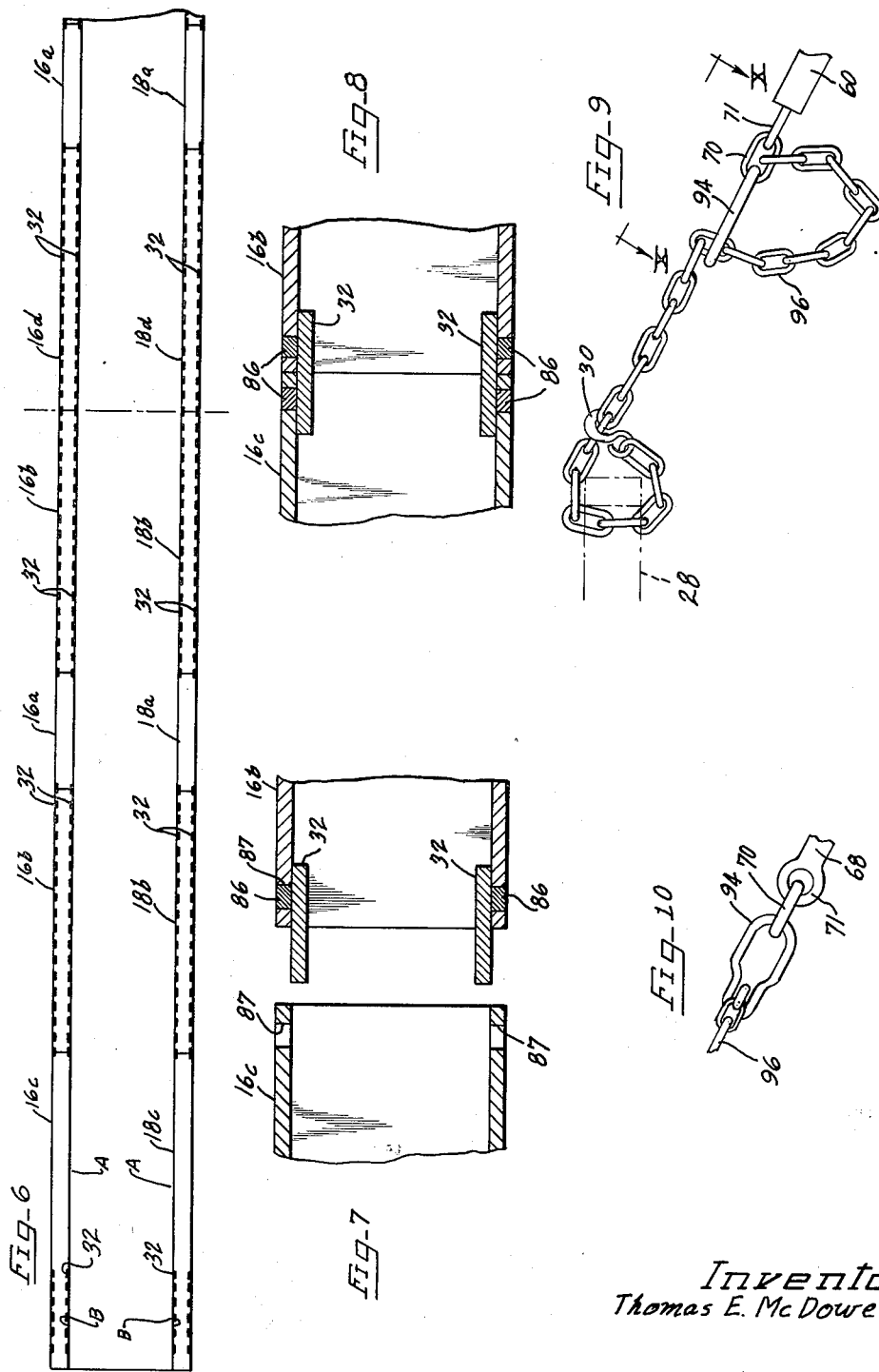

United States Patent Office 3,041,027
Patented June 26, 1962

3,041,027
VEHICLE TIE-DOWN
Thomas E. McDowell, Oak Park, Ill., assignor to Brandon Equipment Co., Inc., Chicago, Ill., a corporation of Illinois
Filed Feb. 23, 1960, Ser. No. 10,489
7 Claims. (Cl. 248—119)

This invention relates to a holding device for use in shipping loads, such as automotive vehicles or the like, and more particularly to a tie-down means which is adapted to position vehicles on a railroad car or the like in a particularly secure manner.

Heretofore, various tie-down devices for use in transporting vehicles by rail have been available, but these have generally been characterized by a relatively large number of parts, as well as a separable relation between these parts such that the vehicles could be easily unfastened from the cars. Also, the parts frequently became lost, and had to be stored when not in use, and reassembled for use.

The present invention provides a vehicle tie-down device which resolves these problems and which is essentially self-storing, so that it is in constant readiness for use, and requires no preliminary assembly procedures, while being proof against inadvertent disassembly and loss.

The invention includes sets of channel members secured in parallel spaced relationship longitudinally of a flatcar or other carrier on which the vehicle or load is to be shipped, and a series of proximately longitudinally spaced projections or lugs secured in mutual registration on the inner sides of the channels for selective engagement with the anchor bar of a fastening chain. The anchor bar is configured and dimensioned to be retained within the channels by means of inwardly extending flanges for each of the channels coacting with the said lugs, and with stop means such as bolts at each end of each of the channels. Thus the chains in the respective channels may be anchored at any of a plurality of predetermined axial positions therein, and the free end of the chain is provided with hook means or the like so that it may be connected to the frame of an automotive vehicle, or otherwise connected to a load. The chains are also provided with turnbuckle means affording a desired degree of tension therein.

The chain structures may be stored within the channels themselves, so that they are always in readiness for use, and will not be inadvertently misplaced or damaged.

Accordingly, it is an object of the present invention to provide a vehicle tie-down device which is effective, rugged and requires no complicated skills or techniques in use.

Another object of the invention is to provide a device as described which is effectively retained in condition for use in a stored position where it is protected against loss or damage.

Another object of the invention is to provide a device as described wherein individual channel members are aligned in parallel relationship and retain anchor means to hold tie-down chains, the anchor means being adjustable by means of complementary retaining means within the channels while being secured against removal from the channel members.

Other objects and advantages of the invention will become apparent as the description proceeds in accordance with the drawings, in which:

FIGURE 1 is a diagrammatic side elevational view of a railroad car carrying vehicles secured thereto in accordance with the present invention;

FIGURE 2 is an enlarged diagrammatic side elevational view, partly in section, of a vehicle as secured to a railroad car or the like by means of the tie-down device of the invention;

FIGURE 3 is a top plan view of the structure shown in FIGURE 2;

FIGURE 4 is an enlarged, fragmentary vertical sectional view of the anchor portion of the tie-down section structure of the invention in relation to the tire of an automotive vehicle and guard means for the vehicle;

FIGURE 5 is an enlarged fragmentary view in vertical section of an end portion of the anchor means of the invention;

FIGURE 6 is a schematic view of channel means in accordance with the invention;

FIGURE 7 is an enlarged, fragmentary horizontal sectional view of end sections of adjacent channel members in disengaged relationship;

FIGURE 8 is a view corresponding to the view of FIGURE 7 showing the channel members in mating relationship;

FIGURE 9 is an enlarged side elevational view of chain means according to the invention; and FIGURE 10 is a fragmentary top plan view taken along the lines X—X of FIGURE 9.

Referring now to the drawings and in particular to FIGURES 1 through 3, a tie-down structure 10 is shown in operative relationship to vehicles 12 and securing the vehicles for transit on a railroad flatcar 14, the structure 10 being also applicable for other types of load, and for other types of transport means or support means.

In the embodiment shown, the tie-down structure 10 includes longitudinally extending sets of channels 16 and 18 in which are anchored successive pairs of tie-down chains 20 and 22 and 24 and 26 connected to the frame structure 28 of the vehicles 12 by means of a grabhook or the like 30 at a free end thereof, and anchored in the respective channels 16 and 18 by lugs or retaining projections 32 positioned in axially proximately spaced relationship and lateral registration along the inner sides of the channels, as hereinafter further described.

Desirably, longitudinally extending guardrails 34 and 36 are disposed in spaced parallel relationship outwardly of the channels 16 and 18 in exterior adjacent relationship to the wheels 38 of the vehicles 12, and as seen in FIGURE 4, these guardrails may be formed in an inverted U-shaped configuration, cross-sectionally, so that a relatively narrow flange 40 extends along the outer edge thereof and a relatively wide flange or base sheet 42 extends inwardly beneath the bottom walls 44 of the individual channels or sets of channels 16 and 18. The channels may be secured to the track flanges 42 by welding 45 in alternately offset, elongated slots 47 or by other suitable means, the guardrails 34 and 36 and the flanges 40 and 42 thereof being secured to the surface of the railroad car 14 by bolt means or in any other suitable manner. It will also be appreciated that the channels 16 and 18 may be connected directly to the support surface within the scope of the invention.

Also in accordance with the invention, each of the channel sections such as the sections 16 and 18 is provided at its opposite ends with stop means, as indicated at 46 and 48, which preferably constitute bolts secured in position by suitable nut elements 51 and 53 welded or otherwise fixed in position on the bolts. It will be appreciated that the channel sections 16 and 18 may be formed in a single length of channel, although they are preferably constructed in axially aligned sections, as hereinafter further described.

In order to secure the chain sections 20 through 26 in a desired position within the channels 16 and 18, each of the said sections is provided with anchor means including an anchor bar such as is indicated by reference numeral 50 in FIGURES 2, 4 and 5, having integrally formed ears 52 and 54 for pivotal connection with a turnbuckle structure 56. Thus the turnbuckle structure includes a screw member 58 which may have a left-handed thread for engagement with the sleeve 60 and an integrally formed eye 62 receivable between the ears 52 and 54 and secured in position by a bolt 64 and fastening nut 66 which is preferably welded to the bolt 64. The sleeve 60 also receives a screw member 68 at its other end which desirably has a right-handed thread, or a thread of opposite direction to the screw member 58, and is provided with an eye 71 at its outer end connected to an elongated link 70 on the chain structure 26, it being noted that the chain structures 20 through 24 are similarly formed.

In order to effect a desired tension adjustment in the chain structures 20 through 26, the sleeve 60 may be formed with a ratchet of annular configuration indicated by reference numeral 73 for removable connection with a ratchet handle (not shown), so that rotation of the sleeve will effect axial displacement of the screw members 58 and 68 without rotation about their axes.

As seen in FIGURE 4, each of the channel elements 16 and 18 is substantially U-shaped in cross-section to form upstanding sides 72 and 74 integral with the bottom sections 44 thereof, and has integral inwardly extending flanges 76 and 78 at the upper ends of the walls 72 and 74. Thus the flanges 76 and 78 define openings 80 extending longitudinally of the channel elements 16 and 18 having a width sufficient to receive the chain structures therethrough but to retain the anchor bars 50 therebeneath. For example, the walls 72 and 74 may be spaced apart a distance of 3¾", internally, while the anchor bars may have a width of substantially 3⅝". The flanges 76 and 78 may extend inwardly for a distance of approximately ½", for example, to assure that anchor bars 50 are retained within the channel elements as described.

The anchor bars 50 may also have a transverse dimension of approximately 1½", so that their diagonal dimensions will prevent turning in the channels from the transverse alignment thereof, although it will be appreciated that the specific dimensions herein set forth are exemplary only and for purposes of illustrating the relationships between the several parts of the tie-down device whereby the chain structures are retained in position while being adjustable axially.

In order to provide the anchoring action referred to, the individual projections or lugs 32 are formed in a trapezoidal configuration whereby side edges 84 and 85 are beveled downwardly and inwardly at a predetermined angle, which for example, may be an angle of 45° from the vertical. The projections may have a predetermined width such as for example ½", for purposes of illustration and are secured to the side walls 72 and 74 as by provision of circular welds 86 formed in complementary recesses in the side walls such as indicated at 87 in FIGURE 7, as hereinafter further described. Other forms of constructing the said projections may also be provided within the scope of the invention.

As seen in FIGURES 4 and 5, the anchor bars 50 extend laterally beyond the ears 52 and 54 a distance such as to engage with the ends or stop shoulders formed at 84 and 85 on the projections 32, so that when the anchoring chains are connected to the opposite ends of a vehicle 12, as illustrated in FIGURE 2, the lines of tension force will lie substantially along the chain, although variations in this relationship may be accommodated without difficulty.

The individual lugs 32 are spaced apart a distance such as to permit movement of the anchor bars therebetween, vertically, as shown in FIGURE 5, and for example, the upper and outer corners of the adjacent lugs may be spaced a distance of 1¼". The top edges 90 of the lugs are spaced below the flanges 76 and 78 to permit slidable movement of the anchor bars 50 thereover to afford adjustment in the axial position of the chains and for example, in the embodiment herewith described, this may be a distance of 15⁄16", with the lugs having a width of 1" and being spaced from the bottom wall 44 at the bottom edge 92 thereof a distance of 7⁄16 of an inch, it being again noted that such dimensions are provided for purposes of illustration. Accordingly, the anchor bar 50 may engage the desired shoulder of one of the projections 32 in full abutting engagement. Although the right-hand ends 85 of the lugs 32 are shown in engagement with the anchor bar 50, with respect to the chain 26, and a similar relation would obtain with respect to the chain 22, it will be appreciated that the trapezoidal construction of the said lugs and the provision of the complementary ends 84 provide a corresponding anchor engagement for the chains 20 and 24. Thus the chains may be positioned at any of a plurality of positions and connected to vehicles as desired. However, the end stops 48 will prevent the movement of the anchor bars 50 outwardly of the channels, inasmuch as these stops are preferably disposed in immediate position above an end lug 32, as shown in FIGURE 5, and for example, midway between the upper edge 90 of the lug and the flanges 76 and 78.

Referring to FIGURES 2, 9 and 10, the fastening structures, as seen with respect to the chain 20, may be formed of other flexible and strong elongated material than chain links, but are herein illustrated as having chain adjustment means including a grab link 94 connected to the link 70 and a length of chain 96 adjustably locking within the grab link 94 and connected at its upper end to the grabhook 30 and at its lower end to the elongated link 70. Accordingly, the length of the chain structure 96 may be varied by changing the link engaged within the grab link 94, the grab link cooperating with the turnbuckle structure 56 so that a complete tensioning adjustment is afforded. It will be understood that other connecting means than the grabhook 30 may be used for fastening to the frame 28, as for example, means directly engageable with the frame may be used.

Referring to FIGURE 6, a schematic showing of one embodiment of the channel means of the invention is provided, it being understood that the channels may be formed in other relationships, such as in continuous form or in a plurality of sections spaced to a predetermined extent longitudinally. In the embodiment of FIGURE 6, a pair of central channels 16a and 18a are mounted centrally on a flatcar or the like and have a U-shaped configuration as hereinabove set forth, but have no anchor lugs therein. To each end of the channels 16a and 18a are secured relatively longer channel members 16b and 18b, having anchor lugs 32 fixed to the inner side thereof, also as above described, but with the endmost lugs extending beyond the channel ends in a bayonet configuration. This relationship is illustrated in FIGURE 7, in particular, wherein it is seen that the lugs 32 are welded to the channels 16b and 18b by welds 86 in apertures 87.

In accordance with the invention, the end lugs of the channels 16b and 18b provide guide means for the adjacent channels 16a and 18a, as well as for channels 16c and 18c, so that the respective channels may be telescoped together in perfect alignment, but are easily shipped and stored prior to such time. The channels 16c and 18c, for example, may have inner plain portions as indicated at A, A and outer portions B, B provided with the anchor lugs 32, and as exemplified in FIGURES 7 and 8, the endmost lugs 32 on channels 16b and 18b may be welded to the adjacent channels 16c and 18c by welds 86 after the interfitting relationship shown in FIGURE 8 has been accomplished. Thereupon, the channels are in positively connected relationship, it being noted the end lugs of channels 16b and 18b adjacent channels 16a and 18a will be similarly welded to corresponding end apertures in the said channels 16a and 18a upon telescoping engagement therewith. A pair of channels 16d and 18d may be provided having lugs 32 on the inner faces except at the end adjacent the channels 16b and 18b at the right-hand side of FIGURE 6, and thus the right end lugs of said channels 16b and 18b may be moved into the channels 16d and 18d and connected by welding as hereinabove described. The right ends of channels 16d and 18d will be adapted to engage in a further pair of channels 16a and 18a, or in other channels having open ends, so that the pattern may be repeated.

By the tie-down construction of the invention, as exemplified hereinabove, many more cars may be transported on an individual flatcar or the like than has been possible with previously available devices, and loading and unloading is simplified. It will, of course, be understood that variations in the dimensions of the individual channel members may be utilized in accordance with particular conditions and depending on the vehicle sizes, the location of plain channel portions and portions having anchor lugs may also be varied.

There has thus been provided a tie-down structure which is both simple and readily adjustable, but which can be tensioned as desired to firmly hold a vehicle or other load in position on a support surface such as a flatcar or other structure. The chains themselves, such as the chains 20 through 26, may be individually stored in position within the channels, as indicated by dot-and-dash in FIGURE 3, with respect to the chains 22 and 26, in which position they are completely protected, since the flange elements 76 and 78 will overlie them. Likewise, there will be no inadvertent removal of the chains, as a result of the provision of the end stops 46 and 48, the anchor bars indicated at 50 having a width to prevent turning and removal through the longitudinal slots 80, but nevertheless being movable past successive projections or anchor elements 32 in the channels as desired.

It may also be noted that the construction of the channels such as the channels 16 and 18 will permit superposed support surfaces to be provided, so that, in accordance with the understanding of those skilled in the art, a plurality of tiers of vehicles may be tied down by means of the tie-down structure of the invention.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A tie-down device for fastening loads such as vehicles to a railroad car or the like comprising an elongated channel having a substantially U-shaped cross-sectional configuration and upstanding side walls, a plurality of proximately axially spaced projections fixed to the inner surfaces of each of said side walls and disposed in registered apirs, axially downwardly and sloping end portions on each of said projections, said end portions forming an acute angle with the axis of the projections, and fastening means adapted to be connected to a load and having an anchor bar extending transversely in said channel for snug slidable movement therein and configurated to be selectively engaged in abutting anchored relationship with registered pairs of projections against the beveled end portions thereof in spaced relation vertically to the uppermost portions of the said upstanding side walls.

2. In a tie-down structure for vehicles or the like, a plurality of elongated channel members having a substantially U-shaped configuration and adapted to be secured to the support surface of a railroad car or the like, and a plurality of axially spaced elongated anchoring lugs on each of the inside side walls of one of said channel members with the lugs on the respective walls being in mutual registration, one pair of said lugs extending outwardly from one of the ends of said one of said channel members, and means fixedly securing said outwardly extending lugs in telescopic relation in said other channel member.

3. In combination with a railroad car such as a flatcar or the like, a tie-down for loads such as automotive vehicles including a channel member with upstanding side walls having a plurality of lugs extending in axially spaced mutually registered alignment along said side walls with a pair of said lugs extending outwardly at each end of said channel member, a complementary channel member having planar inner side wall surfaces fixedly connected at one end to one of said pairs of outwardly extending lugs in telescopic relationship therewith, a channel member having axially spaced mutually registered lugs along a predetermined fraction of the length thereof and receiving the other pair of outwardly extending lugs in telescopically fixed relationship and a channel member having axially spaced mutually registered lugs extending therealong with a pair of said lugs thereon extending outwardly at each end thereof and with one of said pairs of lugs thereon being telescopically fixed in the other end of said channel member having planar inner surfaces.

4. A tie-down device for fastening loads such as vehicles to a railroad car or the like comprising an elongated channel having a substantially U-shaped cross-sectional configuration and upstanding side walls, inwardly extending spaced flanges on each of said side walls defining a longitudinally extending opening therebetween, a plurality of individually formed elongate projections fixedly secured to the inner surfaces of each of said side walls and disposed in registered pairs, and fastening means adapted to be connected to a load and having an anchor bar extending transversely in said channel for snug slidable movement therein above said projections, said projections being spaced beneath the top of said channel to accommodate said slidable movement, said anchor bar being engageable in anchoring relation with a pair of said elongate projections and spaced below the top of said channel in the anchored position thereof.

5. A tie-down device for fastening loads such as vehicles to a railroad car or the like comprising an elongated channel having a substantially U-shaped cross-sectional configuration and upstanding side walls, inwardly extending spaced flanges on each of said side walls defining a longitudinally extending opening therebetween, a plurality of individually formed elongate projections fixedly secured to the inner surfaces of each of said side walls and disposed in registered pairs, and fastening means adapted to be connected to a load and having an anchor bar extending transversely in said channel for snug slidable movement therein beneath said projections, said projections being spaced below the top of said channel to accommodate said slidable movement, at least one end of each of said projections having a downwardly extending end abutment sloping axially towards the other end of said projection and said anchor bar having transverse end extensions to engage with sloping abutments of opposed registered pairs selectively, to hold the fastening means when the fastening means are secured to a load, said anchor bar being spaced below the top of said channel in the engaged position thereof.

6. A tie-down device for fastening loads such as vehicles to a railroad car or the like comprising an elongated channel having a substantially U-shaped cross-sectional configuration and upstanding side walls, inwardly extending spaced flanges on each of said side walls defining a longitudinally extending opening therebetween, a plurality of individually formed elongate projections fixedly secured to the inner surfaces of each of said side walls and disposed in registered pairs, and fastening means adapted to be connected to a load and having an anchor bar extending transversely in said channel for snug slidable movement therein beneath said projections, said projections being spaced below the top of said channel to accommodate said slidable movement, the individual projections on each side of said channel being spaced from one another sufficiently to accommodate tilting movement of the anchor bar therebetween for holding the load between individual opposed registered pairs of the projections and said anchor bar being spaced from the top of said channel when engaging a registered pair of said projections.

7. A tie-down device for fastening loads such as vehicles to a railroad car or the like comprising an elongated channel having a substantially U-shaped cross-sectional configuration and upstanding side walls, inwardly extending spaced flanges on each of said side walls defining a longitudinally extending opening therebetween, a plurality of individually formed elongate projections fixedly secured to the inner surfaces of each of said side walls and disposed in registered pairs, and fastening means adapted to be connected to a load and having an anchor bar extending transversely in said channel for snug slidable movement therein beneath said projections, said projections being spaced below the top of said channel to accommodate said slidable movement and a transverse rodlike stop member at each end of the channel and fixedly secured at its opposite ends to opposite sides of the channel, the transverse width of the anchor bar being slightly less than the width of the channel to prevent rotation therein and removal through said longitudinal opening, said stop members preventing slidable movement of the anchor bar beneath the said projections outwardly of the channel at each end thereof, said anchor bar being spaced below said inwardly extending spaced flanges during engagement thereof with a registered pair of said projections.

References Cited in the file of this patent

UNITED STATES PATENTS

| | | |
|---|---|---|
| 706,974 | Lyle | Aug. 12, 1902 |
| 1,070,445 | Gailor | Aug. 19, 1913 |
| 1,934,697 | Butterworth | Nov. 14, 1933 |
| 2,172,137 | Ewing | Sept. 5, 1939 |
| 2,205,273 | Radey | June 18, 1940 |
| 2,478,088 | Causey | Aug. 2, 1949 |
| 2,674,425 | Wylie | Apr. 6, 1954 |
| 2,859,057 | Elsner | Nov. 4, 1958 |

FOREIGN PATENTS

| | | |
|---|---|---|
| 628,159 | Germany | Mar. 30, 1936 |